United States Patent [19]
Sheesley et al.

[11] 3,877,347
[45] Apr. 15, 1975

[54] HYDRAULIC CONTROL
[75] Inventors: John M. Sheesley, Houston; Ronald A. Gulick, Sugarland; Robert M. McEver, Jr., Houston, all of Tex.
[73] Assignee: Research Engineering Company, Houston, Tex.
[22] Filed: Mar. 13, 1973
[21] Appl. No.: 340,654

[52] U.S. Cl. .................. 91/438; 60/400; 60/403; 60/476; 92/9; 188/312; 188/313
[51] Int. Cl. ............................................ F15b 13/04
[58] Field of Search ......... 60/6, 403, 473, 475, 476, 60/400; 91/6, 31, 32, 55, 437, 435; 92/8, 12, 9, 173; 188/312, 313

[56] References Cited
UNITED STATES PATENTS

| | | | |
|---|---|---|---|
| 2,410,978 | 11/1946 | Kelly | 60/572 |
| 2,657,533 | 11/1953 | Schanzlin et al. | 60/476 |
| 2,685,276 | 8/1954 | Dykes | 91/31 |
| 2,780,065 | 2/1957 | Spannhake | 60/476 |
| 2,807,336 | 9/1957 | Sweeney | 188/312 |
| 2,838,140 | 6/1958 | Rasmusson et al. | 188/313 |
| 2,927,429 | 3/1960 | Carlson | 60/475 |
| 2,999,482 | 9/1961 | Bower | 91/31 |
| 3,176,801 | 4/1965 | Huff | 188/313 |
| 3,646,757 | 3/1972 | Sanders et al. | 60/592 |

FOREIGN PATENTS OR APPLICATIONS

| | | | |
|---|---|---|---|
| 16,807 | 7/1913 | United Kingdom | 92/9 |
| 872,471 | 1961 | United Kingdom | 60/476 |

*Primary Examiner*—Martin P. Schwadron
*Assistant Examiner*—Abraham Hershkovitz

[57] ABSTRACT

System for controlling the speed of a hydraulically oriented, force-application system, including a manually operable override. The control is applicable in balanced or unbalanced hydraulic systems.

3 Claims, 4 Drawing Figures

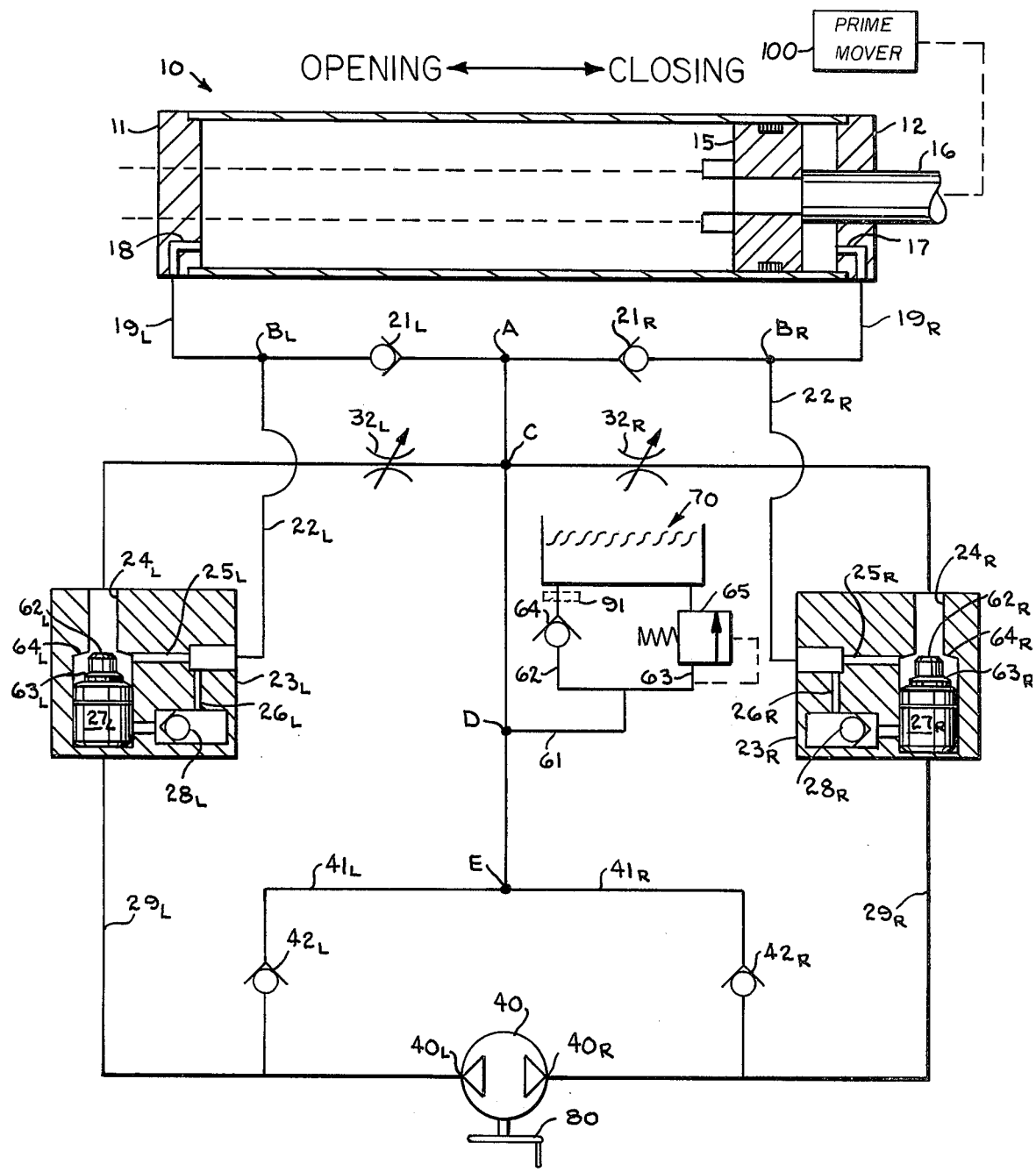

HYDRAULIC CONTROL

BACKGROUND OF THE INVENTION

Hydraulic control systems have long been utilized to control operating functions of devices. Such functions include speed, and its variation. Devices which have utilized hydraulic controls range from door closures to valve actuators to vehicle lifts to dash pots. Ordinarily, a force is provided to the control system from some outside source. The force transmittal member may be gear teeth, or a lever in the case of a door closure, or a piston rod in the case of some valve actuators. Oftentimes, in the past, it would have been desirable to have had a back-up system, i.e., a manual override system for overriding the prime mover or for use in the event of failure, such as power failure, of the prime mover. Further, in control systems utilizing a moving piston, inappropriate provision has been made for unbalanced systems, i.e., systems where more fluid is displaced during one stroke direction than in the other. It is to the solution of these and related problems that this invention is directed.

SUMMARY OF THE INVENTION

Power input from an outside device, to the system causes displacement of fluid from a chamber. Paths are provided, communicating between opposite ends of the chamber, through speed control mechanisms, with branch communication to a combination reservoir, surge chamber. Said paths include means for restricting the flow of fluid therethrough, and thereby controlling the speed of said input, and thereby the speed of said outside device. Further, override means, which may be manually operable, are provided to cause such fluid displacement when desired, as in the case of outside power failure, or when desired to override the prime mover.

DESCRIPTION OF THE DRAWINGS

FIG. 1 is a schematic of the entire control system;

DESCRIPTION OF A PREFERRED EMBODIMENT

Figure 3:
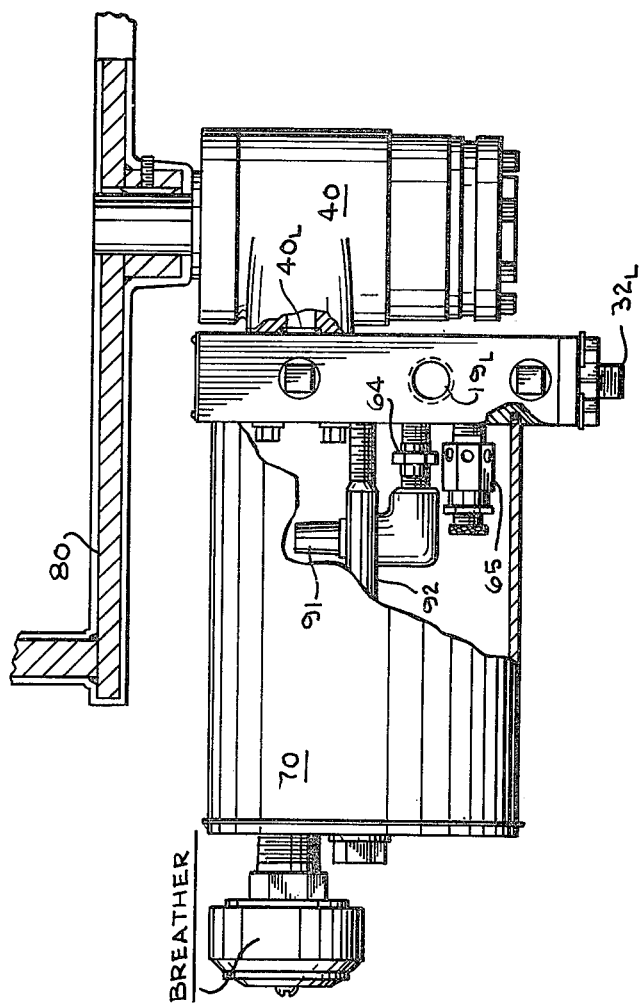
FIG. 3 is a, partly cutaway, end view of an embodiment of the handle-pump-reservoir-valving, combination.

Looking at the schematic of FIG. 1, a fluid cylinder is illustrated generally at 10, having end caps 11, 12. Within the cylinder, a reciprocating piston 15 is shown, bearing a seal around its periphery for moving engagement with the inner wall of cylinder 10. The piston is illustrated to be fixed, on one of its faces, to one end of piston rod 16. The other end of the piston rod would be connected to an outside device, or prime mover, such as generally illustrated at 100. By way of illustration only, the outside device may be a valve actuator having an oscillatable yoke such as that of U.S. Pat. No. 3,704,986, and movement of such a yoke may, by virtue of a linkage with piston rod 16, cause reciprocation of such piston rod. However, it should not be assumed that the control mechanism provided herein may only be used with valve actuators. The prime requirement is that some outside mechanism, whose speed and rythm of operation is to be controlled, have a movable portion thereof linked to rod 16. This invention is directed to the means for controlling the motion of piston 15, and thereby controlling the speed and rythm of whatever device may be linked to rod 16 and thereby to piston 15. Conduit connections 17, 18 are provided in cylinder end caps, for communication between (1) the volume between the respective end caps and the nearest face of piston 15, and (2) the control system described hereinbelow.

Figure 2:
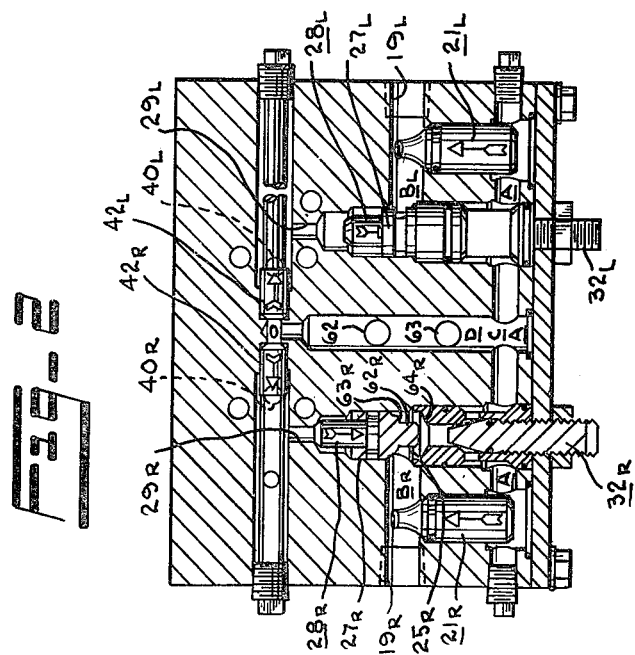
FIG. 2 is a vertical section through an embodiment of the valving system.
Figure 4:
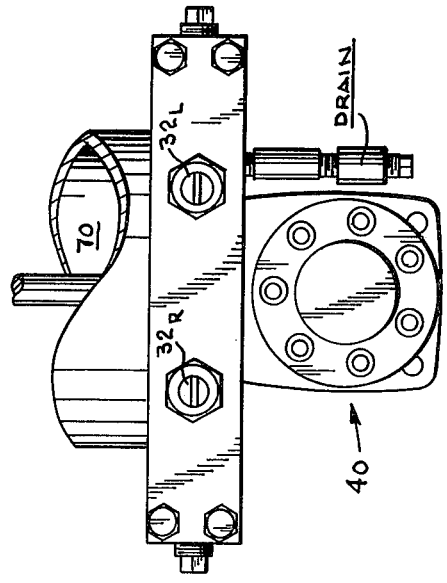
FIG. 4 is a side view of said embodiment, omitting portions thereof.

It should further be understood that the invention, as such, is best depicted in FIG. 1. FIGS. 2–4 merely illustrate one embodiment for accomplishing the desired result. In some instances, the structure shown in the latter 3 figures may vary slightly from the schematic. For example, the schematic shows the poppets 27 and check valves 28 to be positioned laterally adjacent each other, while FIG. 2 shows them to be concentrically aligned. Further, the schematic shows discreet junctures A, C, D, while FIG. 2 depicts them as being a part of a common line. The point to be made is that numerous embodiments may be made, yet fit within the scope of the invention.

Aside from the reservoir portion, discussed later, the control system generally resembles mirror images, i.e., equivalent left and right hand portions. For example, conduits 19L, and 19R lead from opposite cylinder ends to juncture A. Within both conduits 19L and 19R, and intermediate the respective end cap conduits and juncture A, are check valves 21L and 21R, as well as communicating openings BL and BR, leading into conduit connections 22L and 22R. These latter conduit connections lead to poppet valve assemblies 23L and 23R. Poppet valve assembly passageways 24L and 24R communicates between juncture C and the override means described hereinafter. Intermediate juncture C and passageways 24L, 24R are adjustable needle valves 32L, 32R. Communication also exists between conduits 22L, 22R and passageways 24L, 24R, respectively. This comprises branched paths 25L, and 26L on the one side and 25R, 26R on the other. Passageways 24L and 24R each include an enlarged chamber portion, within which is a poppet valve 27L, or 27R. Branches 26L, 26R also include a chamber portion for accommodating check valves 28L, 28R. The end of the poppet valve assembly passageways 24L and 24R, opposite from juncture C, i.e., the lower part in FIG. 1, lead, by conduits 29L, 29R, to pump 40. This pump would be bi-directional, in that it may be caused to act as a pump in one direction, drawing suction from the other, or to reverse itself, drawing suction from said one direction and pumping in said other. Such pumps, per se, are not new. Various means may be utilized to cause such reversal, such as a simple switch activated motor, or preferably as generally illustrated, a handwheel 80.

Juncture C is also connected to junctures D later described, and E. The latter juncture, through branches 41L, 41R communicates with conduits 29L, 29R, on opposite sides of pump 40. Said branches each includes a check valve, 42L, 42R, therein.

Consider now, the reservoir assembly, connected to juncture D. Provision is so made, as previously mentioned, in order to accommodate so-called unbalanced system. Note that within cylinder 10, because of the presence of piston rod 16 attached to one face of piston 15, more fluid is evacuated from the cylinder during the opening stroke, moving to the left in FIG. 1, than during the closing stroke. The system described up to this point would accommodate a balanced system. Such a balanced system would provide for equal displacement of fluid, such as by including a further piston rod connected to the other face of piston 15, as illustrated by the phantom lines. Hereafter, comes the reservoir-surge chamber description, for use with unbalanced systems.

A single conduit 61 links juncture D with branched lines 62, 63, each of which lead to combination reservoir-surge chamber 70. Positioned in line 62 is check valve 64, and filter 91, while pressure relief valve 65 is in the path of line 63. Tie bar 92 (FIG. 3) may fix the reservoir to the remaining elements.

Consider now the operation of the device, omitting for the moment any manual or override operation. As the piston 15 and rod 16 are caused to move to the left, by action of the prime mover, whose speed and rythm are to be controlled, fluid needs to be displaced from the chamber in advance of the piston, and provided to the chamber to the rear of the same piston. Evacuated fluid will course through conduit 19L, whereupon on being blocked by check valve 21L, it may proceed through pathway 22L to poppet valve assembly 23L. Since branch path 26L is blocked, due to check valve 28L, fluid proceeds through conduit 25L, past and/or around poppet 27L, causing poppet 27L to shift downwardly, as in FIG. 1, or upwardly as in FIG. 2, acting as a shuttle valve, the fluid coursing through the upper part of conduit 24L to enter the line leading to juncture C. Prior to reaching said common, fluid flow would be restricted by having to flow through adjustable needle valve 32L. While there might appear to be some flow through the other needle valve 32R, the path of least resistance would be through conduit 19R, and its check valve 21R, in a permitted direction, and through connection 17 into the right hand chamber of FIG. 1. Note that check valves 21L and 21R need be so chosen that they should permit fluid flow, in the acceptable direction, without interfering or overriding with the regulating functions of adjustable needle valves 32L, 32R. As previously discussed, relative to the depicted unbalanced system, more fluid must be evacuated from the left hand chamber, than the right hand one can accommodate. Therefore, part of the fluid that reaches juncture C, rather than proceed toward juncture A will move toward juncture D, and proceed through conduit 61. There, path 62 being blocked by check valve 64, when pressure within the system, and particularly within path 63, builds up to a sufficient degree to overcome the relief setting of pressure relief valve 65, such fluid may continue on to enter member 70, i.e., said member 70 is therein performing as a surge chamber.

When the piston reverses its direction, i.e., is caused to return toward the right, then more fluid needs be provided to the left of the piston, in FIG. 1, than is evacuated to the right of thereof. During this portion of the cycle, fluid is evacuated from the cylinder forwardly of piston 15, through passageway 17, and conduit 19R. There, being blocked by check valve 21R, it courses conduit 22R and enters poppet valve assembly 23R. Since passageway 26R is blocked by check valve 28R, the fluid continues through passageway 25R, by poppet 27R, seating it downwardly in FIG. 1 or upwardly in FIG. 2, and on up passageway 24R, through needle valve 32R, to juncture C. Also, since the pressure on the bckside backside piston 15 is reduced, i.e., less than the reservoir pressure, whether it be atmospheric, or externally induced, fluid from member 70, now acting as a reservoir, will be withdrawn past check valve 64, through conduits 62, 61 to juncture D, and upwardly to juncture C. From C, the combined fluids follow a path past check valve 21L through conduit 19L, passageway 18 and into the chamber at the left side of cylinder 10.

Now, consider the override or auxiliary operation, such as when external power, to reciprocate piston 15, fails. At such a time, it may be desirable to force piston movement, and this is accomplished by supplying fluid, by means of pump 40, to the cylinder chamber on the desired side of piston 15, and withdrawing fluid from the other. For illustration purposes, a handwheel 80 is shown for activating pump 40, although other means for activating, as well as directional reversing, are commercially available. At such a time, pressure through the system would be equalized, there being no pressure buildup since the piston is immobilized. If piston movement to the left is desired, i.e., in an "opening" direction, fluid must be supplied to the right hand chamber. Note that the legend above FIG. 1, refers only to directional piston movement, deemed opening direction and closing direction. In this instance, fluid would be supplied by the pump 40 through opening 40R to conduit 29R and, by vacuum action, withdrawn from the opposite side from conduit 29L through opening 40L. Fluid motion would be blocked by check valve 42R and therefore course through line 29R to enter poppet assembly 23R through the lower opening of passageway 24R. Poppet valve 27R would be moved upwardly by the force of the fluid, permitting such fluid to pass in the permitted direction through check valve 28R, through passageway 26R, and out line 22R. At this point, note that a slight upwardly movement of poppet 27R, results in its nipple 62R effectively closing the upper reaches of passageway 24R, the opening thereto being sealed when poppet lip 63R seats against shoulder 64R. Thus while some fluid may pass through aperture 25R into an annulus formed between the poppet and the cavity wall, such fluid may not escape. Also, the same pressure exists at the bottom surface of poppet 27R, where the area is greater, and thus the poppet lip will tend to remain seated. Fluid entering line 22R will be blocked by check valve 21R, and thus pass through conduit connection 17 to enter cylinder 10, pushing piston 15 to the left. At the same time, vacuum conditions are created in the system to the left of pump 40. Fluid is evacuated through conduit connection 18, blocked by check valve 21L and therefore entering poppet assembly 23L through line 22L. Check valve 28L blocks movement through passageway 26L, and suction in line 29L would resist any tendency of poppet 27L to move upwardly in FIG. 1. Thus, fluid would exit the poppet valve assembly through conduit 24L, needle valve 32L to juncture C. At this point, part of the withdrawn fluid would continue on through line 41L and check valve 42L to recirculate through the system. The excess would tend to branch through line 61, pressure relief valve 65, when pressure exceeds the specified setting, to enter reservoir-surge tank 70. When it is desired to reverse the piston movement, the motor pump 40 may be reversed. Such reverse operation is believed apparent in view of the previous discussion. Pump 40 may also be used to override the external power system, if desired, by operating in the same manner as described above.

It bears reiterating that numerous points of adjustment, or control, are provided. For example, needle valves 32L and 32R may be adjusted so as to restrict fluid flow, thereby acting as a control on the speed of operation. Here, it is repeated, the counterpart needle valve-check valve combinations, such as 32L 21R, or 32R, 21L must be so sized that the check valves do not interfere with needle valve regulation, i.e., check valve openings in the permitted direction must be sufficiently large, as to not override the needle valve control function. Further, the setting of pressure relief valve 65 is capable of adjustment. This, under unbalanced conditions, provides an addition element of control.

As previously stated, FIGS. 2-4 merely illustrate one embodiment of assembling the invention generally shown in FIG. 1. It should be apparent that numerous embodiments would be possible by one skilled in the art without departing from the spirit of the invention, the scope of which is intended to be limited only by the following appended claims.

We claim:

1. A device for controlling the operation of an external member, said device comprising the following:

a cylinder, for containing fluid, said cylinder containing a movable piston therein, said piston being joined to a piston rod which rod extends at least partially without said cylinder;

first fluid conduit means linking one end of said cylinder with said cylinder's other end, said first conduit means including spaced first and second one way check valves, said check valves each restricting fluid flow in opposite directions to each other;

second fluid conduit means, communicatingly connected in parallel to said first fluid conduit means, and across said first and second check valves, said second fluid conduit means including spaced first and second flow regulating valves;

means for fluid communication between said first and second conduit means, said communication means extending from intermediate said flow regulating valves to intermediate said check valves; and third fluid conduit means communicatingly connected in parallel to said second fluid conduit means, said third means including spaced first and second means for removably blocking fluid flow through said second and third fluid conduit means, and an auxiliary pump in said third conduit means in communication with both of said fluid blocking means, whereby upon said pump being operated, one of said blocking means acts to block said second conduit means and permit pumped fluid in said third conduit means to flow to said cylinder via a portion of said second and first conduit means.

2. The device of claim 1 and including a fluid reservoir chamber, said chamber having means for fluid communication with said second fluid conduit means intermediate said flow regulating valves and with said first fluid conduit means intermediate said check valves, said chamber further having means for fluid communication, by branched conduits, with opposite sides of said pump.

3. The device of claim 2, wherein said branched conduits communicating with said reservoir chamber each include a one way check valve.

* * * * *